March 22, 1927. 1,621,827
S. P. BUSH
CAR TRUCK
Filed Dec. 7, 1925
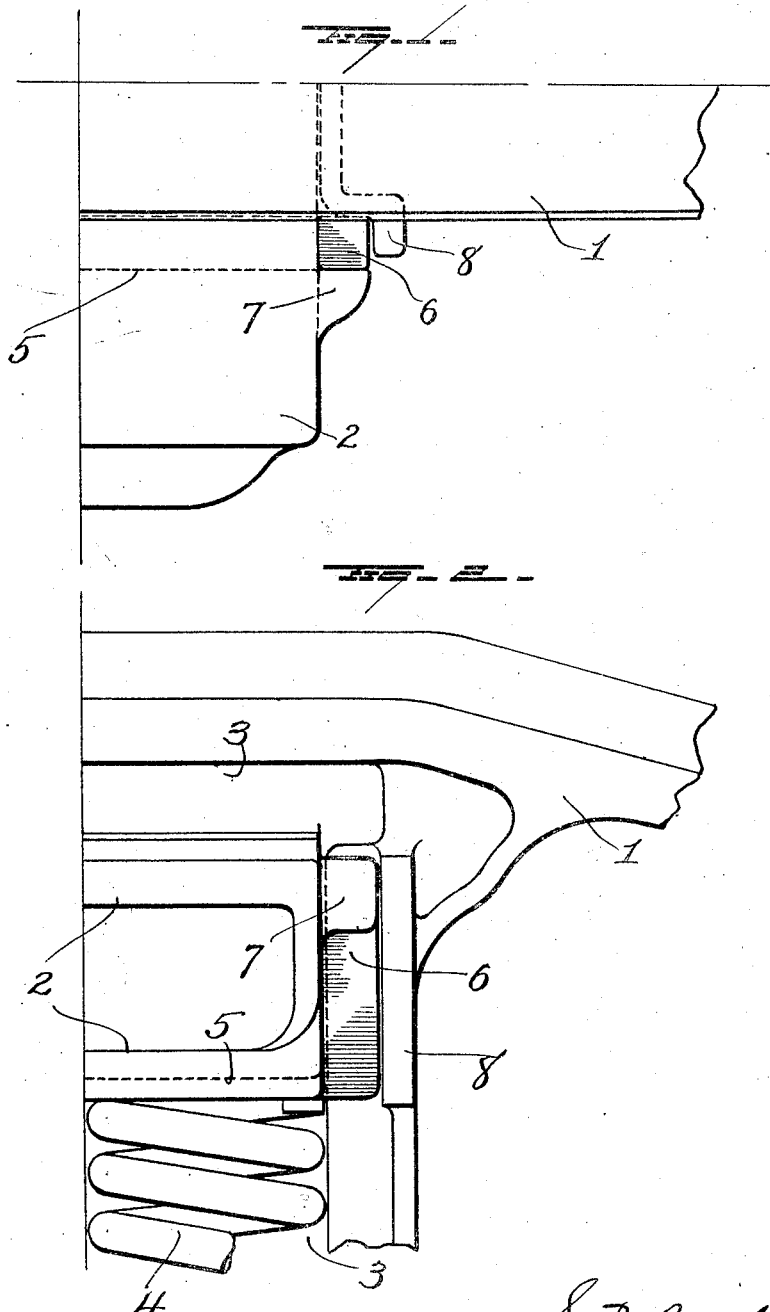

Patented Mar. 22, 1927.

1,621,827

UNITED STATES PATENT OFFICE.

SAMUEL PRESCOTT BUSH, OF COLUMBUS, OHIO, ASSIGNOR TO THE BUCKEYE STEEL CASTINGS COMPANY, OF COLUMBUS, OHIO.

CAR TRUCK.

Application filed December 7, 1925. Serial No. 73,895.

This invention relates to car trucks of the type in which the end of a bolster is inserted through a central transverse opening in a side frame and rests on springs which, in turn, are carried by a spring seat or plank within said opening. It has heretofore been proposed to lock the bolster in place by a transverse key arranged between the bolster and the springs and having an upturned terminal fitting against the side of the bolster and between the side of the side frame and a lug on the side of the bolster. This arrangement is effective as long as the upturned terminal of the key lies flat against the side of the bolster but, owing to wearing strains that may occur or possible tolerance in manufacture, the terminal portion of the key may be bent outward so that it may clear the lug on the bolster and hence fail to perform its function. The object of the present invention, therefore, is to provide means whereby the terminal portion of the key will be positively held against the side of the bolster, and this object is attained in the manner hereinafter set forth and illustrated, for example, in the accompanying drawing.

In the drawing, Figure 1 is a plan view of so much of a car truck as is necessary to an understanding of the invention;

Figure 2 is a side view of the same.

The side frame 1 and the bolster 2 are of the usual form, the end of the bolster projecting through an opening, 3, in the side frame and resting upon springs 4 therein. The key 5 extends across the bottom of the bolster, between the same and the springs, and has an upturned terminal portion 6 which fits between the side frame and the lug 7 on the bolster. To prevent the terminal 6 from standing away from the side of the bolster, I provide a guard or keeper which, in the present instance, is a lug or vertical rib 8 on the side of the side frame. This rib or lug is so disposed and of such vertical extent that it will hold the upstanding terminal of the key positively against the side of the bolster and prevent all spreading of the terminal.

The present invention is extremely simple and efficient and the cost of embodying it in trucks of the described type is negligible.

Having fully described my invention what I claim as new and desire to secure by Letters Patent, is;—

1. In a car truck, the combination of a side frame, a bolster engaged therethrough and provided on its side with a lug in spaced relation to the side frame, a key extending beneath the bolster and having an upstanding terminal portion fitting between the side frame and the lug on the bolster, and a guard carried by the side frame and extending over the terminal of the key to hold it to the bolster.

2. In a car truck, the combination of a side frame, a bolster engaged therethrough and provided on its side with a lug in spaced relation to the side frame, a key extending beneath the bolster and having an upstanding terminal portion fitting between the side frame and the lug on the bolster, and a vertically extending rib on the side frame projecting over the upstanding terminal of the key.

In testimony whereof, I have signed this specification.

SAMUEL PRESCOTT BUSH.